(12) United States Patent
West et al.

(10) Patent No.: US 8,457,000 B2
(45) Date of Patent: Jun. 4, 2013

(54) CALL QUALITY MONITORING

(75) Inventors: Julian Wray West, North Hampton, NH (US); Darryl Dietz, Rye, NH (US)

(73) Assignee: Communications Acquistions, LLC, Wilmington, DE (US)

( * ) Notice: Subject to any disclaimer, the term of this patent is extended or adjusted under 35 U.S.C. 154(b) by 1123 days.

(21) Appl. No.: 11/751,355

(22) Filed: May 21, 2007

(65) Prior Publication Data

US 2008/0063149 A1    Mar. 13, 2008

Related U.S. Application Data

(60) Provisional application No. 60/809,063, filed on May 26, 2006.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/28 | (2006.01) |

(52) U.S. Cl.
USPC ........... 370/242; 370/248; 370/352; 379/1.03

(58) Field of Classification Search
None
See application file for complete search history.

(56) References Cited

U.S. PATENT DOCUMENTS

| | | | |
|---|---|---|---|
| 4,354,062 A | 10/1982 | Mussman et al. | |
| 4,656,366 A | 4/1987 | Davis et al. | |
| 4,763,317 A | 8/1988 | Lehman et al. | |
| 4,905,233 A | 2/1990 | Cain et al. | |
| 5,796,795 A | 8/1998 | Mussman et al. | |
| 6,104,711 A | 8/2000 | Voit | |
| 6,154,463 A | 11/2000 | Aggarwal et al. | |
| 6,188,687 B1 | 2/2001 | Mussman et al. | |
| 6,243,388 B1 | 6/2001 | Mussman et al. | |
| 6,282,574 B1 | 8/2001 | Voit | |
| 6,684,247 B1 * | 1/2004 | Santos et al. .................. 709/224 |
| 6,763,380 B1 * | 7/2004 | Mayton et al. ................ 709/224 |
| 6,795,858 B1 * | 9/2004 | Jain et al. ...................... 709/226 |
| 6,804,712 B1 | 10/2004 | Kracht | |

(Continued)

FOREIGN PATENT DOCUMENTS

| | | |
|---|---|---|
| EP | 1 335 525 | 8/2003 |
| KR | 2003-0023898 | 3/2003 |
| WO | WO2007/140164 | 12/2007 |
| WO | WO2007/140165 | 12/2007 |

OTHER PUBLICATIONS

Int'l Preliminary Report on Patentability (incl. Written Opinion Jul. 3, 2008) in Application No. PCT/US2007/069378, dated Nov. 27, 2008.

(Continued)

*Primary Examiner* — Asad Nawaz
*Assistant Examiner* — Justin N Mullen
(74) *Attorney, Agent, or Firm* — Daly, Crowley, Mofford & Durkee, LLP

(57) ABSTRACT

A method of monitoring quality of a telephone call transmitted over a network includes obtaining a metric associated with the telephone call, where the metric is based on data packets that are transmitted during the telephone call, and determining whether the metric exceeds a threshold. Plural metrics may be obtained and the method may determine whether the plural metrics exceed corresponding thresholds.

11 Claims, 3 Drawing Sheets

U.S. PATENT DOCUMENTS

| | | |
|---|---|---|
| 7,075,922 B2 | 7/2006 | Mussman et al. |
| 7,215,643 B2 | 5/2007 | Mussman et al. |
| 7,339,934 B2 | 3/2008 | Mussman et al. |
| 7,346,043 B1 | 3/2008 | Olshansky |
| 7,363,381 B2 | 4/2008 | Mussman et al. |
| 7,379,471 B2 | 5/2008 | Mitsumori et al. |
| 7,388,946 B1 | 6/2008 | Mussman et al. |
| 2002/0012363 A1* | 1/2002 | Beidas et al. ............ 370/516 |
| 2002/0159440 A1 | 10/2002 | Mussman et al. |
| 2003/0012178 A1 | 1/2003 | Mussman et al. |
| 2003/0088698 A1 | 5/2003 | Singh et al. |
| 2003/0091165 A1* | 5/2003 | Bearden et al. ........... 379/88.08 |
| 2003/0142633 A1 | 7/2003 | Wall et al. |
| 2003/0204619 A1* | 10/2003 | Bays ............................ 709/238 |
| 2004/0139209 A1 | 7/2004 | Mussman et al. |
| 2005/0025043 A1 | 2/2005 | Mussman et al. |
| 2005/0025123 A1 | 2/2005 | Mitsumori |
| 2005/0117562 A1 | 6/2005 | Wrenn et al. |
| 2005/0189401 A1 | 9/2005 | Butzer et al. |
| 2005/0243725 A1 | 11/2005 | Wrenn et al. |
| 2005/0243816 A1 | 11/2005 | Wrenn et al. |
| 2005/0243817 A1 | 11/2005 | Wrenn et al. |
| 2005/0243830 A1 | 11/2005 | Wrenn et al. |
| 2006/0031519 A1 | 2/2006 | Helliwell et al. |
| 2006/0209701 A1 | 9/2006 | Zhang et al. |
| 2006/0274733 A1 | 12/2006 | Mussman et al. |
| 2007/0070976 A1 | 3/2007 | Mussman et al. |
| 2007/0133567 A1 | 6/2007 | West |
| 2007/0143449 A1 | 6/2007 | West |
| 2007/0165607 A1 | 7/2007 | Mussman et al. |
| 2007/0283042 A1 | 12/2007 | West |
| 2007/0286361 A1 | 12/2007 | West |
| 2008/0070528 A1 | 3/2008 | Joyner et al. |
| 2008/0112327 A1 | 5/2008 | Mussman et al. |

OTHER PUBLICATIONS

Supplementary Search Report in European Patent Application No. 07797624, dated Nov. 9, 2009.

Extended Search Report in Application No. EP 07797624.9, dated Nov. 24, 2009.

Varela et al., "Multi-Service Routing—A New QoS Routing Approach Supporting Service Differentiation", Telecommunications 2005, Advanced Insutrial Conference on Telecom / Service Assurance with Partial and Internmitted Resources Conference / E-Learning on Telecom. Workshop. AICT/SAPIR/ELETE 2005, Proc. Jul. 17-20, 2005.

Int'l Preliminary Report on Patentability in Application No. PCT/US2007/069375, dated Mar. 3, 2009.

International Search Report and Written Opinion in Application No. PCT/US07/69378, dated Jul. 3, 2008.

International Search Report and Written Opinion in Application No. PCT/US07/69375, dated Jul. 17, 2008.

Machine Translation of Korean Patent Application No. 2003-0023898 (Pub. Date: Mar. 26, 2003).

Reply to EP Examination Report in EP Application No. 07797624.9, filed Sep. 1, 2010.

EP Communication dated Mar. 22, 2010 in EP Application No. 07797624.9.

Action and Response History in U.S. Appl. No. 11/751,391.

Reply to Final Office Action of Jun. 9, 2011, in U.S. Appl. No. 11/751,391, filed Dec. 8, 2011.

* cited by examiner

CALL QUALITY MONITORING

CLAIM TO PRIORITY

This patent, application claims the benefit of, and priority to, U.S. Provisional Application No. 60/809,063 filed on May 26, 2006. The contents of U.S. Provisional Application No. 60/809,063 are hereby incorporated by reference into this patent application as if set forth herein in full.

TECHNICAL FIELD

This patent application relates generally to monitoring the quality of a telephone call transmitted over a network.

BACKGROUND

Voice over Internet Protocol (VoIP) enables users to make telephone calls over a computer network, such, as the Internet. VoIP is used to convert a voice signal from a telephone into a digital signal which can be transmitted over the computer network. At a receiving end, VoIP is used to convert the digital signal back into a voice signal.

SIP is a signaling protocol for VoIP. In particular, SIP is a request/response protocol that allows devices to set up a communication session over a network. Real-time transport protocol (RTP) is typically used during the communication session to carry voice and other data between the devices on the network.

Problems can arise during transmission of telephone calls over a network. For example, excessive network traffic can create a bottleneck at a node on the network, thereby affecting the quality of telephone calls transmitted through the node. Also, a node on the network can fail or function improperly, which can also have a deleterious effect on telephone calls transmitted through the network. These problems are not unique to telephone calls that are implemented using. VoIP (e.g., telephone calls routed over a computer network), bin rather such problems can occur in any network over which telephone calls are routed.

SUMMARY

This patent application describes methods and apparatus, including computer program products, for monitoring quality of a telephone call transmitted over a network.

In general, this patent describes a method of monitoring quality of a telephone call transmitted over a network. The method comprises obtaining a metric associated with the telephone call, where the metric is based on data packets that are transmitted during the telephone call, and determining whether the metric exceeds a threshold. The method may also include one or more of the following features, either alone or in combination.

Obtaining the metric may comprise obtaining plural metrics associated with the telephone call. Determining whether the metric exceeds the threshold may comprise determining whether the plural metrics exceed corresponding plural thresholds.

The metric may comprise at least one of data, packet loss and jitter of the data packets. The method may comprise performing a traceroute through the network to obtain the metric, increasing a frequency of the traceroute if the metric exceeds the threshold, obtaining a second metric after increasing the frequency of the traceroute, determining whether the second metric exceeds the threshold, and adjusting a frequency at which the traceroute is performed based on whether the metric exceeds the threshold.

The method may comprise performing the following actions at least until the metric is below the threshold: obtaining the metric periodically and, each time the metric is obtained, determining whether the metric exceeds the threshold.

The method may comprise receiving information from nodes of the network, and rooting subsequent telephone calls based on the information. The information may comprise one or more records associated with telephone calls routed through different paths of the network. The method may comprise using the information and other information relating to routing of other telephone calls through the network to locate a problem on the network. The subsequent telephone calls may be rented to attempt to avoid the problem. The metric may relate to degradation in call quality. The degradation represented by the metric may not be detectable by a human ear. The metric may be weighted. The weight may correspond to a system that initiates the telephone call.

The foregoing method of monitoring quality of a telephone call may be implemented using one or more machine-readable media. The one or mom machine-readable media stores instructions that are executable by one or more processing devices to perform the method. The method may be implemented using one or more apparatus and/or systems that include one or more processing devices and memory for storing instructions that are executable by one or more processing devices.

In general, this patent application also describes a method of locating faults on a network. The method comprises identifying an endpoint device on the network that is experiencing a problem with placing a telephone call over the network, and identifying paths through the network that are experiencing a problem and that are used by the endpoint device but not by other endpoint devices. The method may also include one or more of the following features, either alone or in combination.

The method may include using real-time transfer protocol (RTP) data and/or real-time transfer control protocol (RTCP) data to identify the fault in the network or to identify a limit is another network that is inbound or outbound to the network. The RTP data and/or the RTCP data may be used to identify faults in the network by time based on a condition of the network.

The foregoing method of locating faults on a network may be implemented using one or more machine-readable media. The one or more machine-readable media stores instructions that are executable by one or more processing devices to perform the method. The method may be implemented via one or more apparatus, and/or systems that include one or more processing devices and memory for storing instructions that are executable by the one or more processing devices.

The details of one or more examples are set form in the accompanying drawings and the description below. Further features, aspects, and advantages will become apparent from the description, the drawings, and the claims.

DETAILED DESCRIPTION

Figure 1:
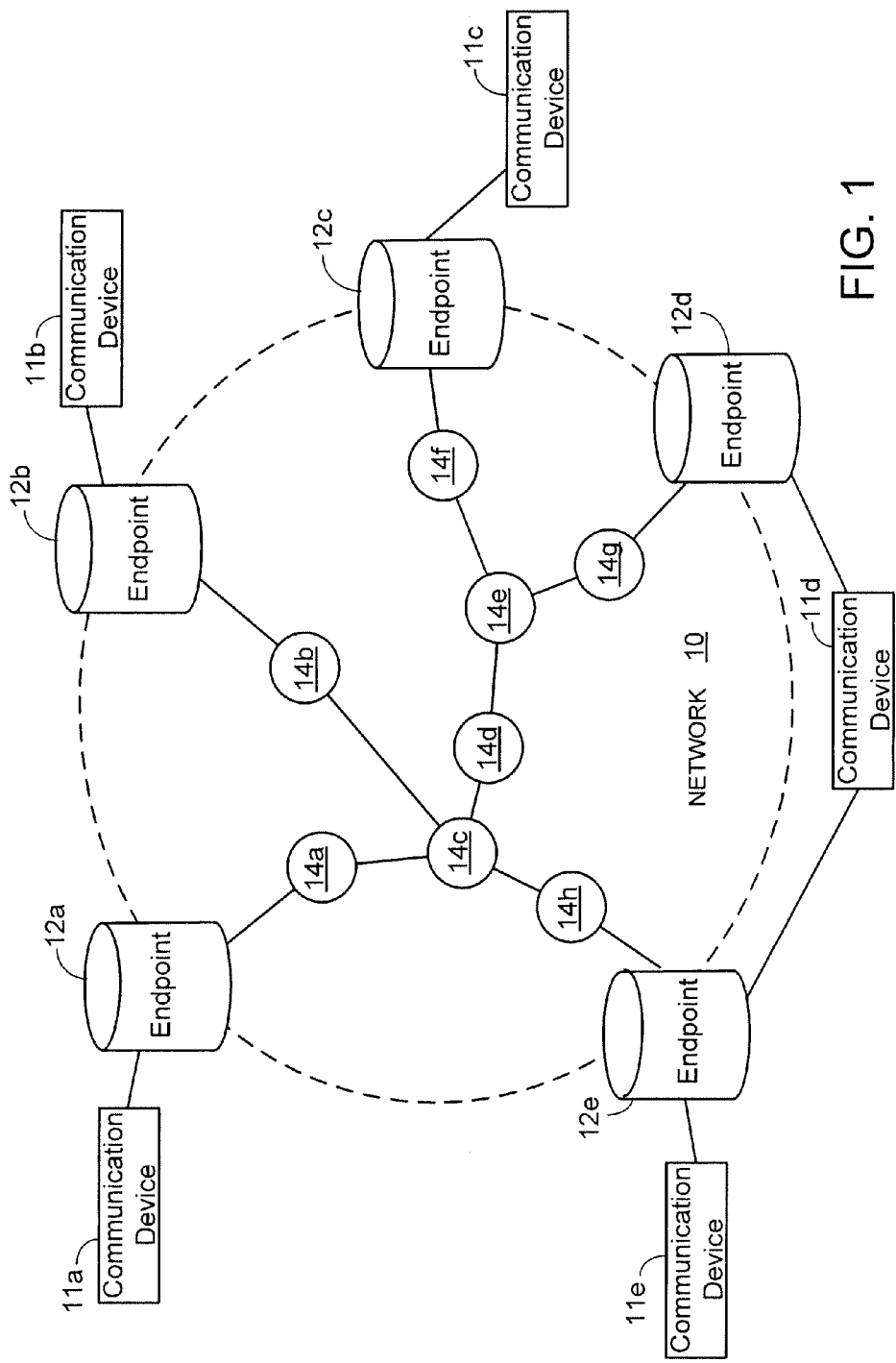
FIG. 1 is a block diagram of a network on which a process for monitoring the quality of a telephone call transmitted over a network may be implemented.

FIG. 1 shows a network 10, over which devices 11a to 11e, such as telephones, communicate. Devices 11a to 11e (which are hereinafter referred to as "communication devices") may be VoIP-enabled, or non-VoIP-enabled. For example, the communication devices may be standard telephones, cellular telephones, VoIP-enabled telephones, or any combination thereof. The communication devices may also include processing devices, such as computers or any other data processing apparatus including, but not limited to, desktop or laptop computers, personal digital assistants ("PDAs"), and gaming devices.

Network 10 may be an IP-enabled, network, and may include a local area network (LAN), such as an intranet, and/or a wide area network (WAN), which may, or may not, include the Internet. Network 10 may be wired, wireless, or a combination of the two. Network 10 may also include part of the public switched telephone network (PSTN).

For the purposes of this description, network 10 can be conceptualized as a set of nodes. These nodes include endpoint devices (or simply, "endpoints") 12a to 12e and intermediary devices 14a to 14h for routing data, including telephone calls, between the various endpoints. Examples of intermediary devices include, but are not limited to, routers, switches, gateways, or the like. Examples of endpoints include servers for routing telephone calls, monitoring call quality, and adjusting routing based on call quality, as described in more detail below. Other examples of endpoints include servers or other computers that are maintained by services provides including, but not limited to, long-distance providers, such as MCI® and Sprint®, or VoIP providers.

Figure 2:
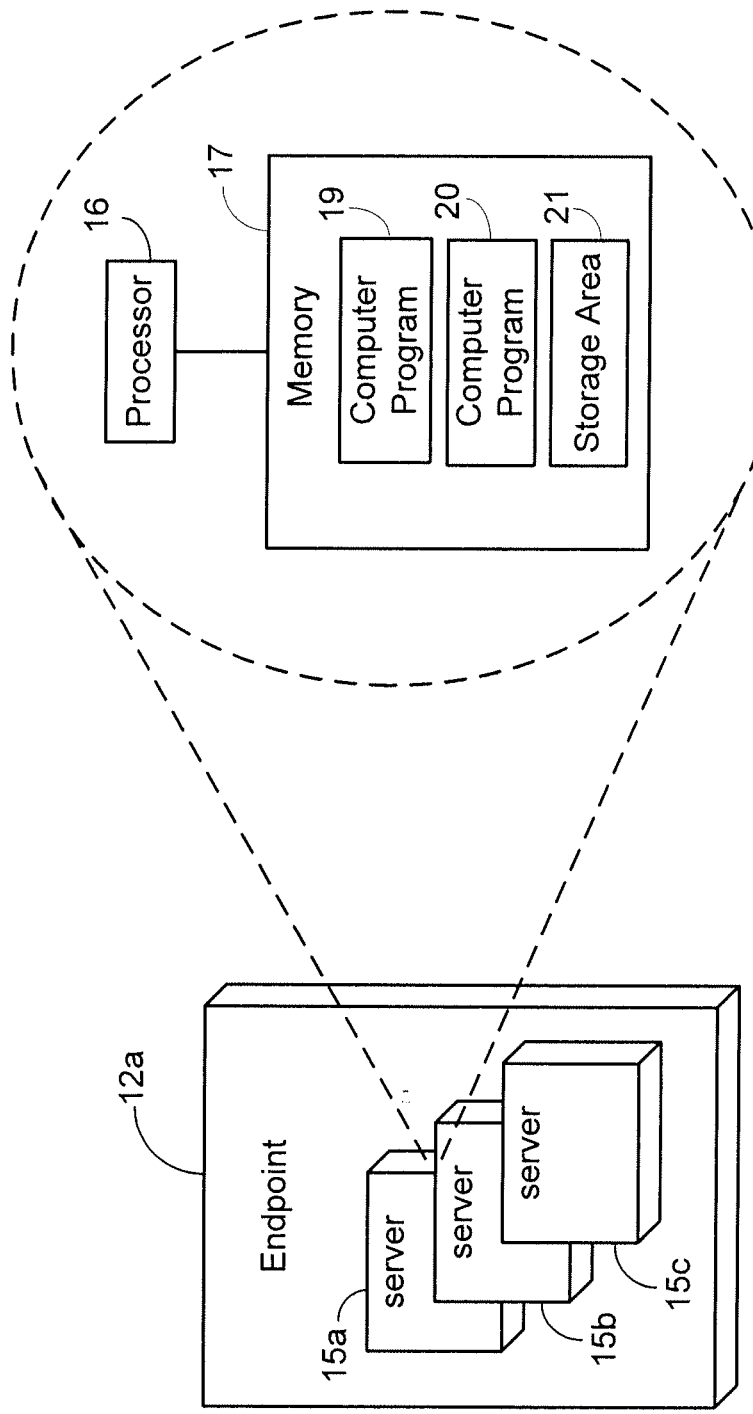
FIG. 2 is a block diagram of an endpoint device on fee network of FIG. 1.

Each of endpoints 12a to 12e may be identical in structure and function, or at least have certain structure and functionality in common. This common structure and functionality is described with respect to endpoint 12a (FIG. 2). Since the other endpoints contain this structure and functionality, detailed descriptions thereof are omitted.

Endpoint 12a may include one server 15a or multiple server 15a to 15c (servers 15b and 15c are depicted using dashed lines to indicate that they are optional). Each of servers 15a to 15c may have the same, or similar, hardware and/or software, configuration. In this implementation, servers 15a to 15c act together to perform, the various functions described below, in other implementations, a single server may perform all of the server functions. In the case of multiple servers, server 15a may act as a controller or "load balancer" for the remaining servers 15b and 15c. In this role, server 15a may route, data, requests, and instructions between a client (e.g., a VoIP communication device) and a "slave" device, such as server 15b. Server 15a may store information locally, then route data to another device, such as device 15b. For the purposes of the following, such internal communications between server 15a and any slave devices will be assumed.

Server 15a may be any type of processing device that is capable of receiving and storing data, and of communicating with VoIP clients. As shown in FIG. 2, server 15a includes one or more processors 16 and memory 17 that stores computer programs that are executed by processor(s) 16. In this regard, memory 17 stems a computer program 19 for communicating with other devices using, e.g., session initiation protocol (SIP). Memory 17 also contains one or more computer programs 20 for executing process 25 described herein, and one or more storage areas 21 for use as data storage.

As shown in FIG. 1, in this implementation, each communication device 11a to 11e communicates over network 10 via an endpoint. For example, VoIP-enabled communication device 11a communicates through endpoint 12a; VoIP-enabled communication device 11b communicates through endpoint 12b; non-VoIP-enabled communication device 11d communicates through endpoints 12e and/or 12d; and so on. In other implementations, one or more of communication devices may sot go through an endpoint to reach network 10.

Figure 3:
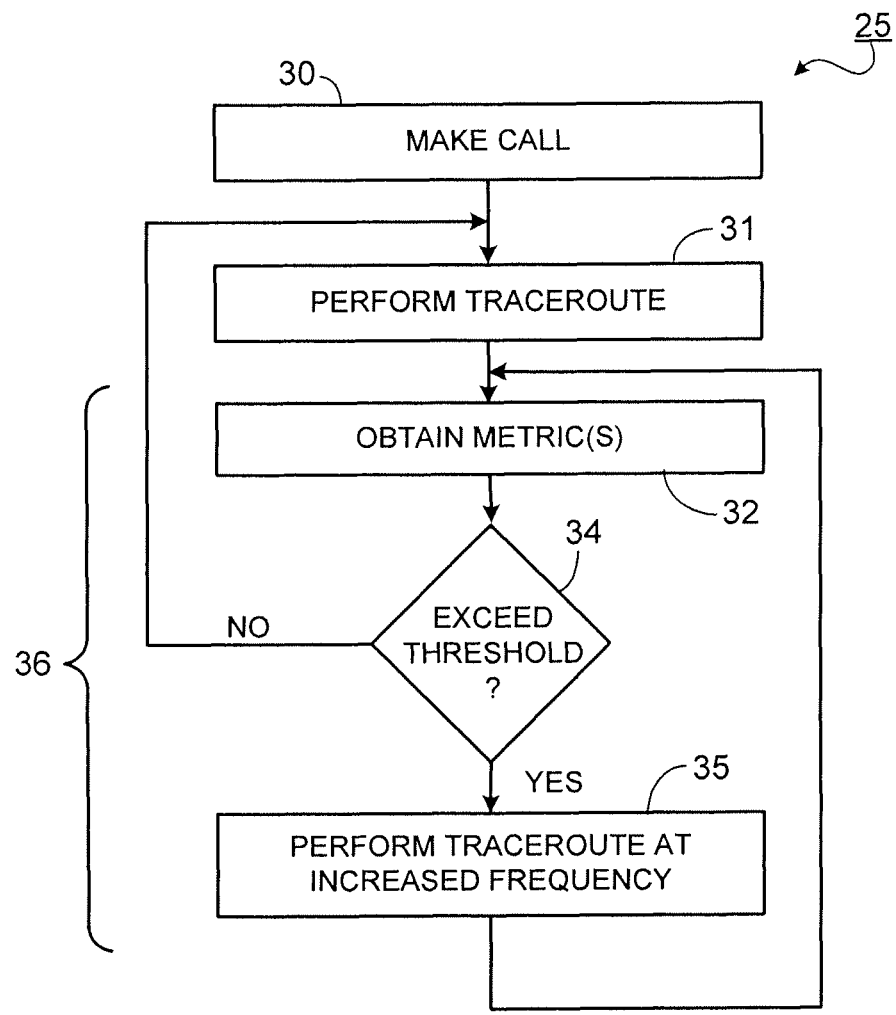
FIG. 3 is a flowchart showing a process for monitoring the quality of a telephone call transmitted over a network.

Referring to FIG. 3, process 25 is shown which may be performed by computer program 20 in one or more endpoints to monitor the quality of one or more telephones call transmitted across network 10, and/or to re-route one or more subsequent telephone calls based on information obtained via the monitoring. Process 25 will be described in the context of endpoint 12a (here, a computer, such as a server), however, process 25 may be performed by any and all endpoints or other devices on network 10.

According to process 25, endpoint 12a makes (30) a telephone call over network 10. That is, endpoint 12a receives call data from a communication device 11a, such as a telephone. Endpoint 12a may then formulate a call, e.g., to another endpoint 12d, such as a server for a long distance provider. In this implementation, the call is established using SIP and data packets for the call are transferred using RTP. Real-time transfer control protocol (RTCP) is used to provide out-of-band control information RTP. RTCP provides feedback on the quality of service (QoS) being provided by RTP. QoS may also be based on evaluation of the RTP packets. One feature of RTCP is that it provides for monitoring of lost data packets and jitter at the source of a call at the destination of a call, and at one or more nodes between the source and destination. Jitter is a variation in packet transit delay, which may be caused by several factors including, but not limited to, queuing, contention and serialization effects. With respect to monitoring lost data packets, data packets are typically sequential. RTCP is able to identity lost data packets based on a break in the packet sequence.

By using RTP and RTCP collected data, faults can be associated wits a local network, an inbound network, or an outbound network. Furthermore, changes in call quality may vary by time-of-day, e.g., times with greater amounts of traffic may experience lower call quality. The RTP and RTCP may be used to identify the times of day that provide lowest call quality for given network conditions.

Once the call is established, process 25 performs (31) a traceroute for the call. Generally speaking, a traceroute identifies a path that data packets for the call take through network 10 and the amount of time it took to arrive at each node (i.e., hop) of the network. The traceroute may be implemented by sending a "ping" to each hop on the network, initially, the traceroute is performed at a predetermined frequency, such as every five seconds. The traceroute thus establishes a baseline for the network. The baseline may be a point to which subsequent operation of the network may be compared.

The traceroute also establishes the network topology for use in identification of command and unique paths for multiple endpoints. This may be done in order to facilitate fault location, e.g., by observing which endpoints experience a problem, which do not, and then correlating the common and unique parts of the paths through the network. For example, network paths that are unique to selected endpoints are more likely to contain a fault if the selected endpoints are experiencing problems and other endpoints (e.g., that share common network paths with the selected endpoints) are not.

There may also be a correlation of data packet loss over time in a traceroute from a single endpoint, which can aid in location of the network fault.

Process 25 obtains (32), via the traceroute, one or more metrics associated with the call. That is, in response to the ping, the device that initiated the traceroute receives information (the metrics) from the device that was "pinged". In this implementation, the metrics include, but are not limited to, amounts of jitter and packet loss between the source and destination of the call. As indicated above, RTCP provides for monitoring of lost data packets and jitter from the source of a call. The traceroute obtains this RTCP-maintained information. The traceroute also enables identification of nodes of network 10 that have failed or that are not working properly. Referring to FIG. 1, for example, process 25 may receive no information beyond node 14c (between, source 12a and destination 12e) in response to the traceroute. From this, process 25 may infer that one or more nodes beyond node 14c has either failed, or is not working properly.

After process 25 obtains the metrics, process 25 performs a comparison (34) of the metrics to a predetermined threshold. The individual metrics may be compared to separate corresponding thresholds or, alternatively, the metrics may be combined into a single metric and compared to a single threshold. If one or more metric(s) exceed one or more of the threshold(s), process 25 increases (35) the frequency of the traceroute (e.g., from five second intervals to one second intervals), and returns to block 32, where part 36 of process 25 is repeated until the metric(s) are below the threshold(s). The frequency is increased in order to obtain additional information from the network.

In this implementation, a threshold may correspond to an acceptable QoS, and may relate, e.g., to an acceptable amount of jitter and/or an acceptable packet loss (e.g., twenty packets lost in a live second interval). The amount of call degradation represented by the threshold may not be detectable by the human ear. Thus, routing corrections may be made, as described below, before call degradation on a route reaches an audible level.

Process 25 continues to perform trace-routes as described above during the course of the call. The information obtained via the traceroutes may be stored in endpoint 12a. As explained above, this information defines the QoS associated with the call, and may include the number of packets lost during the call or during a predefined period of the call, the amount of jitter during the call or during a predefined period, and information indicating problems in network 10, such as which network nodes are disabled.

In this implementation, the QoS information is obtained for multiple calls made by the same endpoint and for multiple devices on the same network 10. In some implementations, the information is obtained for every call made by each endpoint and for every endpoint on network 10. In any case, the information may be sent to a central monitoring system, winch may coordinate call routing, as described below. The central monitoring system may be a designated endpoint or other device on network 10.

More specifically, the central monitoring system receives the QoS information from the various endpoints (or other devices) on network 10 and, based on that information, designates call routes through network 10. The central monitoring system may designate routes that have the fewest number of packets lost, routes that have the least jitter, routes in which no device are inoperable or disabled, routes that have the shortest path to a destination, or some combination thereof.

In designating its routes, the central monitoring system may use information from the various endpoints to identify, with greater precision, faults on network 10. Since the central monitoring system receives information from endpoints that have used different routes through the network, the central monitoring system is able to use triangulation to identify faults on network 10. For example, the central monitoring system may receive information from device 12d that it does not receive traceroute information beyond node 14e. The central monitoring system may also receive information from device 12e that it is able to access endpoint 12b. Knowing this, and the configuration of network 10, the central monitoring system is able to ascertain that node 14d is not operating properly and, as such, designate routes that do not include node 14d in an attempt to avoid network faults. Factors other than those described above may also be taken into consideration by the central monitoring system when designating routes through network 10. For example, the central monitoring system may correlate data packet loss and jitter over the network based on a sequence of traceroutes (or pings) to determine loss over the network. The correlation may also be over time, and from a single or multiple nodes, in order to determine the location of a fault on the network.

The designated routes may be distributed from the central monitoring system to the various endpoints. Updates to these routes may be made via process 25, which may be performed on a continuous basis in order to keep the routes up-to-date. Each endpoint may then route subsequent telephone calls in accordance with its designated route(s). For example, the subsequent telephone calls may be routed to avoid problems on network 10.

The central monitoring system may designate routes that are advantageous for each device given the device's location on network 10. Also, weights may be assigned to QoS information from different endpoints. As a result, some endpoints (e.g., predefined trusted endpoints) may have a greater effect on the routes designated by the central monitoring system than others. In like manner, a group or groups of endpoints may be given greater weight man others endpoints.

Process 25 and its various modifications (hereinafter referred to as "the processes") can be implemented, at least in part, via a computer program product, i.e., a computer program tangibly embodied in one or more information carriers, e.g., in one or more machine-readable storage media, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information earners suitable for embodying computer program instructions and data include all forms of non-volatile storage area, including by way of example, semiconductor storage area devices, e.g., EPROM, EPROM, and flash storage area devices; magnetic disks, e.g., internal hard disks or removable disks; magneto-optical disks; and CD-ROM and DVD-ROM disks.

The processes are not limited to use with VoIP-enabled telephones or to any particular network configuration. Likewise, the processes are not limited to the specific hardware and protocols described herein.

Elements of different implementations described herein may be combined to form other implementations not specifically set forth above. Other implementations not specifically described herein are also within the scope of the following claims.

What is claimed is:

1. A method of monitoring quality of a telephone call transmitted over a network, the method comprising:
   performing a traceroute through the network;
   obtaining a plurality of metrics associated with the telephone call, the plurality of metrics being obtained via the traceroute, and the plurality of metrics being based on data packets that are transmitted during the telephone call;
   determining whether the plurality of metrics exceeds a corresponding plurality of thresholds;
   increasing a frequency of the traceroute when at least one of the plurality of metrics exceeds its corresponding threshold;
   after increasing the frequency of the traceroute, re-obtaining the plurality of metrics;
   determining whether the re-obtained plurality of metrics exceeds the corresponding plurality of thresholds;
   decreasing the frequency of the traceroute when the re-obtained plurality of metrics is determined to be below the corresponding plurality of thresholds;
   receiving information from nodes of the network using the trace route, the information based on the metric exceeding the threshold;
   using the information and other information relating to routing of other telephone calls through the network to locate a problem on the network, the problem comprising at least one of a bottleneck, a failed node, or a node not functioning properly; and
   routing subsequent telephone calls based on the information to avoid the problem.

2. The method of claim 1, wherein the metric comprises at least one of data packet loss and jitter of the data packets.

3. The method of claim 1, wherein the information comprises records associated with telephone calls routed through different paths of the network.

4. The method 1, wherein the metric relates to a degradation in call quality, the degradation represented by the metric not being detectable by a human ear.

5. The method of claim 1, wherein the metric is weighted, the weight corresponding to a system that initiates the telephone call.

6. One or more non-transitory machine-readable media for storing instructions that are executable to monitor quality of a telephone call transmitted over a network, the instructions for causing one of more processing devices to:
   perform a traceroute through the network;
   obtain a plurality of metrics associated with the telephone call, the plurality of metrics being obtained via the traceroute, and the plurality of metrics being based on data packets that are transmitted during the telephone call;
   determine whether the plurality of metrics exceeds a corresponding plurality of thresholds;
   increase a frequency of the traceroute when at least one of the plurality of metrics exceeds its corresponding threshold;
   after increasing the frequency of the traceroute, re-obtaining the plurality of metrics;
   determining whether the re-obtained plurality of metrics exceeds the corresponding plurality of thresholds;
   decrease the frequency of the traceroute when the re-obtained plurality of metrics is determined to be below the corresponding plurality of thresholds;
   receive information from nodes of the network using the trace route, the information based on the metric exceeding the threshold;
   use the information and other information relating to routing of other telephone calls through the network to locate a problem on the network, the problem comprising at least one of a bottleneck, a failed node, or a node not functioning properly; and
   route subsequent telephone calls based on the information to avoid the problem.

7. The one or more non-transitory machine-readable media of claim 6, wherein the metric comprises at least one of data packet loss and jitter of the data packets.

8. The one or more non-transitory machine-readable media of claim 6, wherein the information comprises records associated with telephone calls routed through different paths of the network.

9. The one or more non-transitory machine-readable media of claim 6, wherein the information is limited to records associated with telephone calls routed through different paths of the network.

10. The one or more machine-readable media 6, wherein the metric relates to a degradation in call quality, the degradation represented by the metric not being detectable by a human ear.

11. The one or more machine-readable media of claim 6, wherein the metric is weighted, the weight corresponding to a system that initiates the telephone call.

* * * * *